United States Patent
Ban

(10) Patent No.: US 7,287,715 B2
(45) Date of Patent: Oct. 30, 2007

(54) MAGNETIC TAPE CARTRIDGE

(75) Inventor: Keiji Ban, Ibaraki (JP)

(73) Assignee: Hitachi Maxell, Ltd., Ibaraki-shi (JP)

( * ) Notice: Subject to any disclaimer, the term of this patent is extended or adjusted under 35 U.S.C. 154(b) by 0 days.

(21) Appl. No.: 11/198,290

(22) Filed: Aug. 8, 2005

(65) Prior Publication Data
US 2006/0032961 A1    Feb. 16, 2006

(30) Foreign Application Priority Data
Aug. 10, 2004 (JP) ............................ 2004-233017

(51) Int. Cl.
*G03B 23/02* (2006.01)
(52) U.S. Cl. .................. 242/344; 242/338; 242/912
(58) Field of Classification Search ................ 242/344, 242/338, 348, 357, 563, 912, 148; 360/132–134
See application file for complete search history.

(56) References Cited

U.S. PATENT DOCUMENTS

| | | | | |
|---|---|---|---|---|
| 5,220,371 A | * | 6/1993 | Tanii et al. ................ 242/912 |
| 5,234,174 A | * | 8/1993 | Pagano et al. ............. 242/912 |
| 5,239,437 A | * | 8/1993 | Hoge et al. ................ 360/132 |
| 5,321,455 A | * | 6/1994 | Cocca ........................ 242/348 |
| 5,351,159 A | * | 9/1994 | Dodt et al. ................. 360/132 |
| 5,390,870 A | * | 2/1995 | Sawada et al. ............. 242/344 |
| 5,541,796 A | * | 7/1996 | Sawada ....................... 360/132 |
| 5,579,191 A | * | 11/1996 | Alexander et al. .......... 360/132 |
| 6,560,070 B2 | * | 5/2003 | Takino ........................ 360/133 |
| 6,607,155 B2 | * | 8/2003 | Takaha et al. .............. 242/344 |
| 6,811,108 B2 | * | 11/2004 | Iino ............................ 242/348 |

FOREIGN PATENT DOCUMENTS

| GB | 2 113 395 | * | 1/1982 |
| JP | 2002-367336 | * | 12/2002 |
| JP | 2002-367336 A | | 12/2002 |
| JP | 2002-373479 | * | 12/2002 |
| JP | 2002-373479 A | | 12/2002 |

\* cited by examiner

*Primary Examiner*—William A. Rivera
(74) *Attorney, Agent, or Firm*—Birch, Stewart, Kolasch & Birch, LLP

(57) ABSTRACT

A tape cartridge capable of reliably identifying difference in type among tape cartridges without causing a tape drive side to have increased costs is provided. On the outer surface of a main case, an identification indicator is formed in a stripe shape having a grain printed portion and a mirror surface portion arranged alternately toward a loading direction of a magnetic tape cartridge onto a tape drive. An indicator format of the identification indicator on the magnetic tape cartridge, which is displaced and moved in the loading direction when loading operation of the magnetic tape cartridge onto the tape drive is conducted, is read by an optical reader mounted on the tape drive. This makes it possible to obtain type information on the magnetic tape cartridge on the tape drive side.

2 Claims, 5 Drawing Sheets

MAGNETIC TAPE CARTRIDGE

BACKGROUND OF THE INVENTION

The present invention relates to a magnetic tape cartridge having an identification indicator for identifying type information peculiar to the cartridge including tape characteristics and a tape standard of the magnetic tape on the tape drive side.

It is publicly known, as shown in Patent Documents of JP 2002-373479 A (FIG. 1, FIG. 2) and JP 2002-367336 A (FIG. 1, FIG. 2) for example, that in the field of magnetic tape cartridges, an identification indicator which can be read by an optical reader mounted on the tape drive side is provided on the outer surface of the main case. In the Patent Documents, a two-dimensional code as an identification display is formed on the outer surface of the main case.

The two-dimensional codes can carry data with a data size several dozen to several hundred times larger than the data size of bar codes, and therefore according to the tape cartridges in the Patent Documents, ample information can be transmitted to the tape drive side. The problem of this system is inevitable increase in manufacturing costs of the tape drive due to an expensive optical reader as the two-dimensional codes need to be read by the optical reader having a CCD area image senor incorporated in the tape drive. There is further a disadvantage that a read portion of this kind of CCD area image sensor is relatively large, which requires considerable design change on the tape drive side, leading to increase in manufacturing costs of the tape drive.

SUMMARY OF THE INVENTION

An object of the present invention is to provide a tape cartridge capable of reliably identifying difference in type among tape cartridges without causing the tape drive side to have increased costs.

As shown in FIG. 1, the present invention is about a magnetic tape cartridge made up of a reel 2 disposed inside a main case 1 for housing a magnetic tape 3 in a wounded state, and an identification indicator 7 formed on the outer surface of the main case 1 for identifying type information peculiar to the cartridge including tape characteristics and a tape standard of the magnetic tape 3 on the side of a tape drive D. As shown in FIG. 1 and FIG. 2, the identification indicator 7 is in a stripe shape having a grain printed portion 10 and a mirror surface portion 9 arranged alternately toward a loading direction 11 of the magnetic cartridge onto the tape drive D, and an indicator format defined by combination of these grain printed portion 10 and the mirror surface portion 9 is set in conformity with the type information. Moreover, as shown in FIG. 3, when loading operation of the magnetic tape cartridge onto the tape drive D is conducted, the indicator format of the identification indicator 7 on the magnetic tape cartridge, which is displaced and moved in the loading direction inside the tape drive, is read by an optical reader 15 mounted on the tape drive D, so that the type information on the magnetic tape cartridge can be obtained on the tape drive D side.

The grain printed portion 10 herein refers to a printed region having microscopic asperities formed by printing with use of a print ink containing microscopic particles. As the microscopic particles mixed in the print ink, any one of elastomers, calcium silicates, natural collagens, fine glasses, Shirasu balloons, resin beads, or combinations thereof may be used. As the mirror surface portion 9, aluminum pieces and plastic pieces subjected to aluminum evaporation treatment for example may be used.

Further, as shown in FIG. 4, the present invention is about a magnetic tape cartridge made up of a reel 2 disposed inside a main case 1 for housing a magnetic tape 3 in a wounded state, and gear teeth 27 formed on a bottom surface of the reel 2 so as to be vertically engaged with a drive gear 26 of a drive shaft 25 on the tape drive side, the bottom surface of the reel 2 facing an outer surface of the main case through a drive aperture 29 open in a bottom wall of the main case 1. As shown in FIG. 5, an identification indicator 30 for identifying type information peculiar to the cartridge including tape characteristics and a tape standard of the magnetic tape 3 on a tape drive side is disposed concentrically about a center of the gear teeth 27 in an outer peripheral portion away from the gear teeth 27 on the bottom surface of the reel 2. The identification indicator 30 is in a two-color circular shape having two kinds of colored portions 31, 32 different in light reflectance formed alternately in a circular ring direction, and an indicator format defined by combination of these colored portions 31, 32 is set in conformity with the type information. While the reel 2 is rotated by the drive shaft 25, the indicator format of the identification indicator 30 is read by an optical reader 33 mounted on the tape drive, so that the type information on the magnetic tape cartridge can be obtained on the tape drive side.

In the present invention in a first aspect (corresponding to claim 1), first, an indicator format defined by combination of the grain printed portion 10 and the mirror surface portion 9 is preset in conformity with the type information peculiar to the cartridge including tape characteristics and a tape standard. Then, in the manufacturing process of the tape cartridge, the indicator format corresponding to each type is formed on the outer surface of the main case 1.

Once such a tape cartridge is loaded onto the tape drive D, the magnetic tape cartridge is displaced and moved in a loading direction 11 by a loading mechanism of the tape drive D as shown in FIG. 3 from a posture position shown by a virtual line to a loading position shown by a solid line. During the displacement and movement process, the optical reader 15 irradiates detection light from a light emitting device 16 to the identification indicator 7. At this point, an indicator format of the identification indicator 7 defined by combination of a width size of the loading direction 11 and an arrangement position of respective mirror surface portions 9 is detected based on a detection signal from a light receiving device 17, and based on the detection result, the type of the magnetic tape cartridge is determined. Then, based on the determination result, processing corresponding to the type of the magnetic tape cartridge is conducted.

As described above, in the present invention, on the outer surface of the main case 1, the identification indicator 7 is formed in a stripe shape having a grain printed portion 10 and a mirror surface portion 9 arranged alternately toward the loading direction 11 of the magnetic tape cartridge onto the tape drive D, and the indicator format of the identification indicator 7 on the magnetic tape cartridge, which is displaced and moved in the loading direction 11 when loading operation of the magnetic tape cartridge onto the tape drive D is conducted, is read by the optical reader 15 mounted on the tape drive D, so that the type information on the magnetic tape cartridge can be obtained on the tape drive D side. Therefore, unlike the conventional tape cartridges having two-dimensional code identification indicators, adoption of the expensive optical reader including CCD area image sensor is not necessary, which enables the tape cartridge in the present invention to contribute to reduction in manufacturing costs of the tape drive. More particularly, the optical reader 15 can be structured into a so-called single scan line-type reader capable of detecting the indicator format of the identification indicator 7 with a single beam of detection light, which allows considerable cost reduction of the reader compared to the conventional optical readers having CCD area image sensors, thereby making it possible to proportionally contribute to reduction in manufacturing costs of the tape drive. This kind of single scan line-type optical reader is smaller in size than the image sensor-type readers, and therefore the tape drive with the reader to be incorporated therein is sacred from considerable design change, which is counted as another contribution for reduction in manufacturing costs of the tape drive. Above all, the tape cartridge in the present invention is advantageous as the identification indicator 7 is simpler in structure than the two-dimensional code and the optical reader 15 for reading the data is inexpensive, thereby allowing considerable reduction in expense necessary for introducing an identification means to the tape cartridge and the tape drive.

In the present invention in a second aspect (corresponding to claim 2), as shown in FIG. 5, the identification indicator 30 in a two-color circular shape having two colored portions 31, 32 different in light reflectance is formed in an outer peripheral portion away from the gear teeth 27 on the bottom surface of the reel 2, and while the reel 2 is rotated by the drive shaft 25, the indicator format of the identification indicator 30 is read by the optical reader 33 mounted on the tape drive, so that the type information on the magnetic tape cartridge can be obtained on the tape drive side.

In the present aspect, the effects similar to those in the first aspect can be achieved. That is, unlike the conventional tape cartridges having two-dimensional code identification indicators, adoption of the expensive optical reader including CCD area image sensor is not necessary, which enables the tape cartridge in the present invention to contribute to reduction in manufacturing costs of the tape drive. More particularly, the optical reader 33 can be structured into a so-called single scan line-type reader capable of detecting the indicator format of the identification indicator 30 with a single beam of detection light, which allows considerable cost reduction of the reader compared to the conventional optical readers having CCD area image sensors, thereby making it possible to proportionally contribute to reduction in manufacturing costs of the tape drive. This kind of single scan line-type optical reader is smaller in size than the image sensor-type readers, and therefore the tape drive with the reader to be incorporated therein is sacred from considerable design change, which is counted as another contribution for reduction in manufacturing costs of the tape drive. Above all, the tape cartridge in the present invention is advantageous as the identification indicator 30 is simpler in structure than the two-dimensional code and the optical reader 33 for reading the data is inexpensive, thereby allowing considerable reduction in expense necessary for introducing an identification means to the tape cartridge and the tape drive.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

First Embodiment

Figure 1:
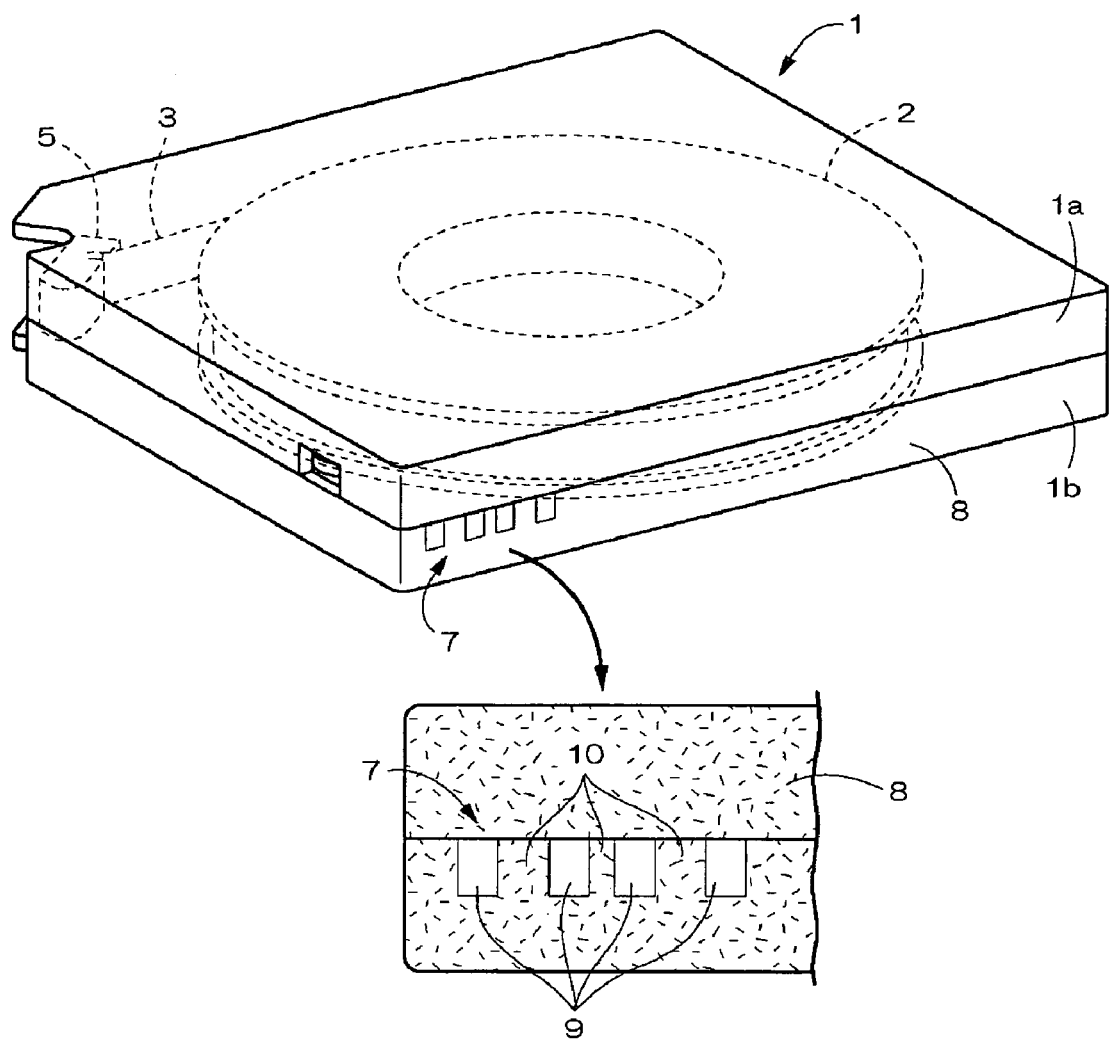
FIG. 1 is a perspective view for showing a tape cartridge according to the present invention.
Figure 2:
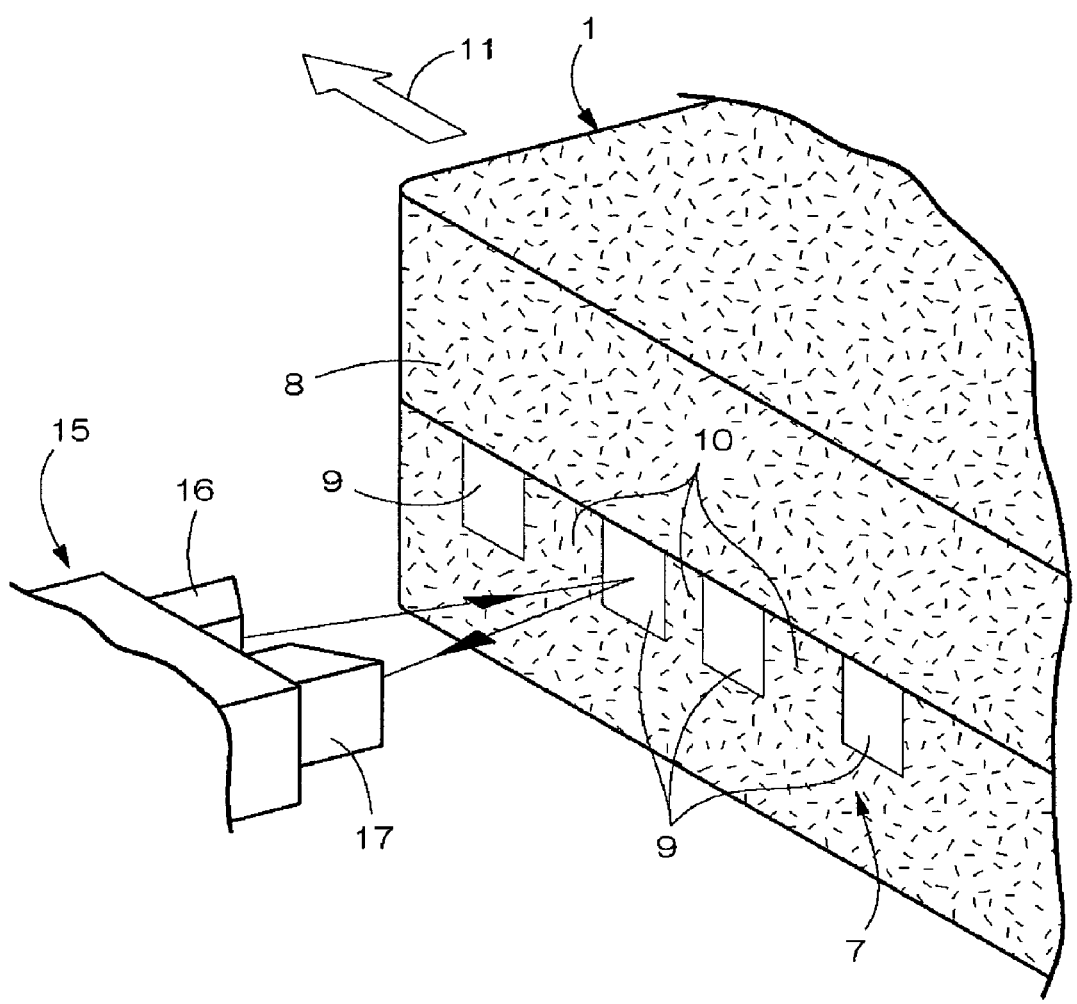
FIG. 2 is a perspective view for showing a main part of the tape cartridge according to the present invention.
Figure 3:
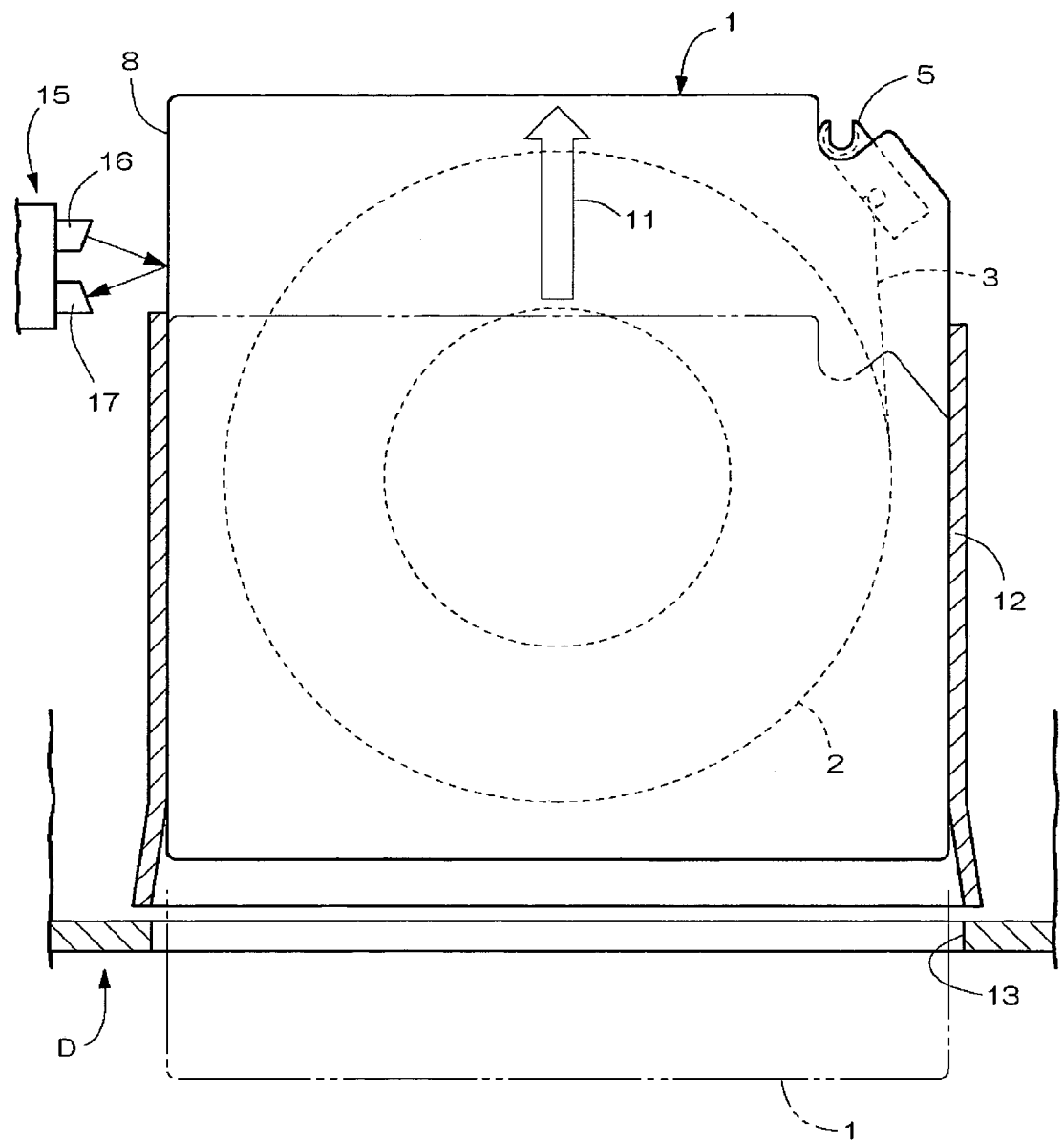
FIG. 3 is a view for explaining an identification method on the tape cartridge according to the present invention.

FIG. 1 through FIG. 3 show a first embodiment in which a magnetic tape cartridge according to the present invention is applied for computer data backup. As shown in FIG. 1 and FIG. 3, the magnetic tape cartridge has a box-shaped main case 1 formed by combining plastic upper and lower cases 1a and 1b so as to face each other. Inside the main case 1, a single reel 2 is disposed, and a tape (magnetic tape) 3 for recording data signals is wound around the reel 2. There is shown a reader pin 5 which is connected to a tape supply end and is caught by coupling means on the tape drive side. When the magnetic tape cartridge is loaded onto the tape drive D, the tape 3 is pulled to the outer front side of the main case 1 via the reader pin 5.

As shown in FIG. 1 through FIG. 3, an identification indicator 7 for identifying type information peculiar to the cartridge including tape characteristics and a tape standard of the tape 3 on the tape drive D side is provided on the right-and-left side face (left-hand side face 8 in the drawing) of the main case 1. The identification indicator 7 is composed of a mirror surface portion 9 which demonstrates sufficient light reflectivity and a grain printed portion 10 which has light reflectivity lower than the mirror surface portion 9, with these mirror surface portion 9 and the grain printed portion 10 being arranged alternately toward a loading direction 11 of the tape drive D (a hollow arrow mark: see FIGS. 2 and 3). More particularly, the identification indicator 7 is in a stripe shape having the grain printed portion 10 and the mirror surface portion 9 arranged alternately toward the loading direction 11 of the magnetic cartridge onto the tape drive D. Herein, the identification indicator 7 was formed by printing the grain printed portion 10 on the entire outer surface of the main case 1 and applying four aluminum films as the mirror surface portion 9 on the rear end portion of the left-hand side face 8.

The indicator format of the identification indicator 7 defined by combination of these grain printed portion 10 and the mirror surface portion 9 is set at various formats in conformity with the type information of the magnetic tape cartridge. More particularly, the indicator format of the identification indicator 7 defined by a width size of the mirror surface portion 9 along the loading direction 11 and a wide size of the grain printed portion 10 formed between adjacent mirror surface portions 9, 9 along the loading direction 11 (i.e., an interval size between the mirror surface portions 9 in the loading direction 11) is set to be the format in conformity with the type information of the magnetic tape cartridge.

The tape drive D has a loading mechanism for loading the magnetic tape cartridge, a drive mechanism for rotatably driving the tape reel 2, a signal read/write mechanism for pulling out the tape 3 and conducting both read and write access to the tape 3, and a control circuit for controlling each mechanism, each disposed in the box-shaped case. In FIG. 3, there are shown a loading frame 12 constituting the loading mechanism, and a loading port 13 formed on the front face of the case for inserting and loading the magnetic tape cartridge.

In FIG. 2 and FIG. 3, there is shown an optical reader 15 incorporated in the tape drive D for reading the identification indicator 7. The optical reader 15, which is composed of a light emitting device 16 for irradiating detection light toward the identification indicator 7 and a light receiving device 17 for receiving the detection light reflected by the identification indicator 7, is a single scan line-type reader for detecting an indicator format of the identification indicator 7 with a single beam of detection light irradiated from the light emitting device 16. The optical reader 15 is secured on the left-hand side face of a loading space of the magnetic tape cartridge in the tape drive D, or more specifically, secured at a position facing the movement path of the identification indicator 7 in the tape drive D and in horizontal orientation so that the light emitting/receiving devices 16, 17-face the movement path.

As shown in FIG. 3, when the magnetic tape cartridge is inserted and loaded from the loading port 13 along the loading frame 12, the magnetic tape cartridge is displaced and moved in a loading direction by the loading mechanism of the tape drive D from a posture position shown by a virtual line to a loading position shown by a solid line. During the displacement and movement process in the tape drive D, the optical reader 15 irradiates detection light from the light emitting device 16 to the identification indicator 7. Based on a detection signal sent at this point from the light receiving device 17, an indicator format of the identification indicator 7 defined by combination of a width size of the loading direction 11 and an arrangement position of respective mirror surface portions 9 is detected, and based on the detection result, the type of the magnetic tape cartridge is determined. More particularly, since the displacement/movement speed during loading of the cartridge by the loading mechanism on the tape drive D side is almost constant, the width size of the mirror surface portion 9 and the like can be detected from a detection time of detection light by the light receiving device 17. Then, based on the determination result, processing corresponding to the type of the magnetic tape cartridge is conducted.

Second Embodiment

Figure 4:
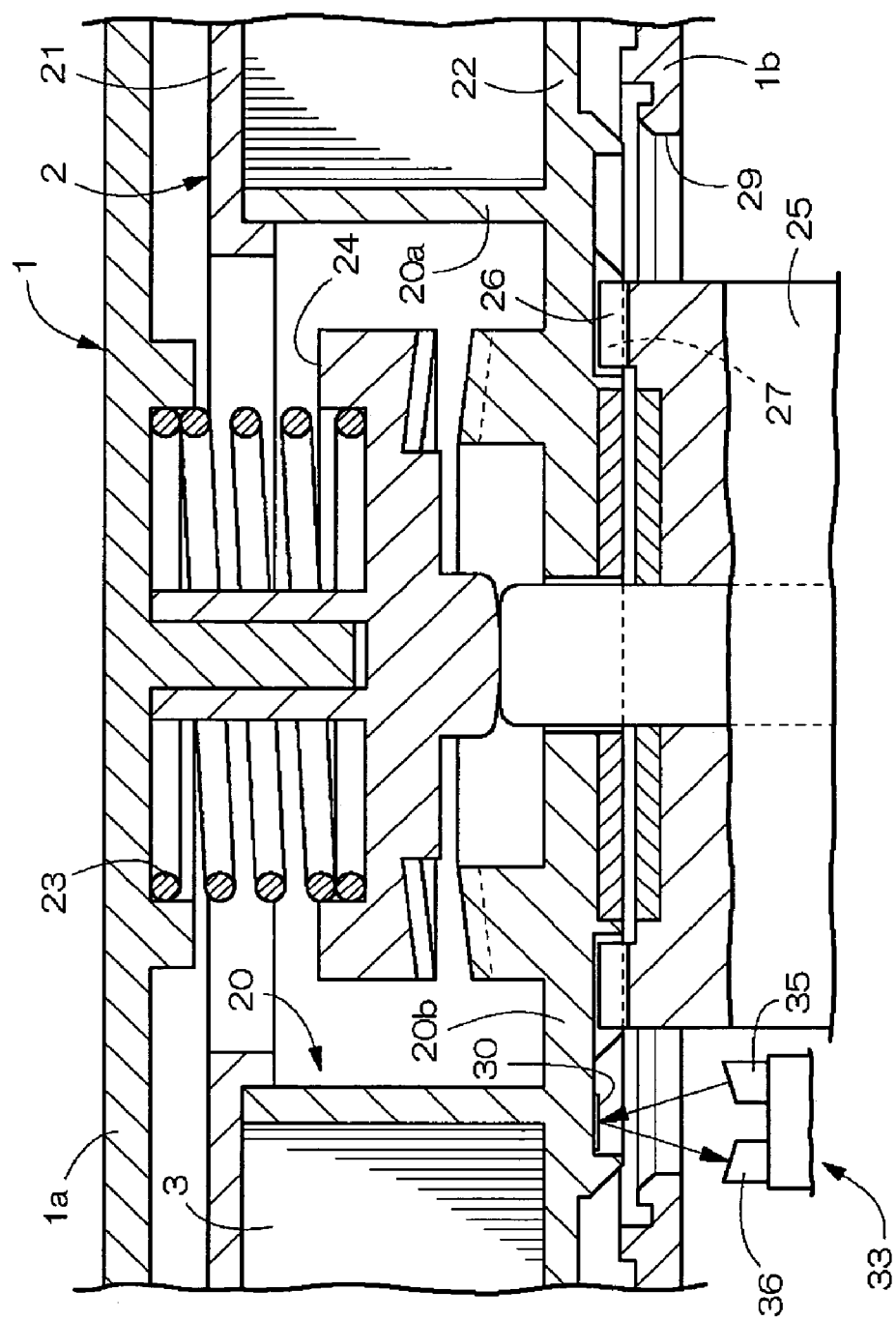
FIG. 4 is a longitudinal sectional side view for showing the tape cartridge according to the present invention.
Figure 5:
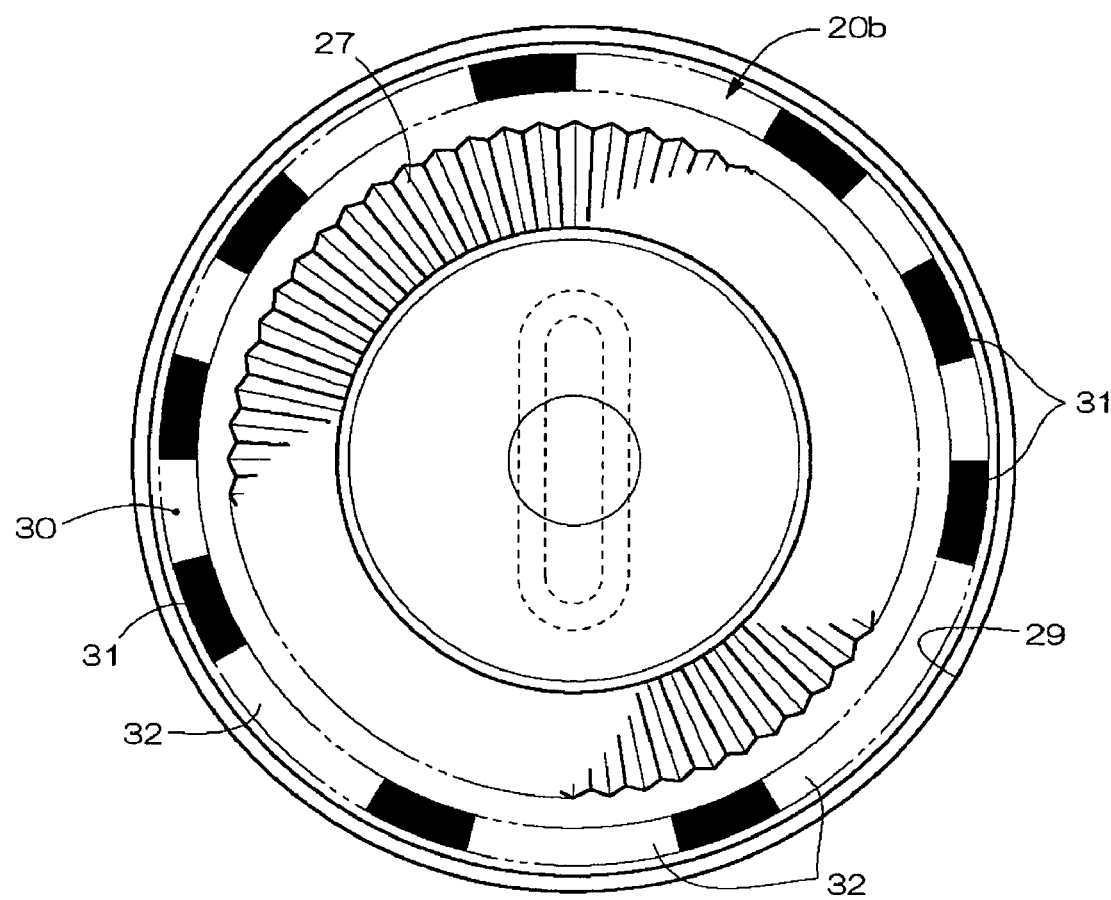
FIG. 5 a plane view showing a main part of the tape cartridge according to the present invention.

A second embodiment of the magnetic tape cartridge according to the present invention is shown in FIG. 4 and FIG. 5. As shown in FIG. 4, the magnetic tape cartridge has a box-shaped main case 1 formed by combining plastic upper and lower cases 1a and 1b so as to face each other. Inside the main case 1, a single reel 2 is disposed, and a tape (magnetic tape) 3 for recording data signals is wound around the reel 2.

The reel 2 is a plastic molding composed of: a bottomed cylinder-shape hub 20 having a round cylinder wall 20a, a bottom wall 20b and an openable upper face; an upper flange 21 molded integrally with an upper outer periphery of the hub 20 in a protruding state; and a disc-shaped lower flange 22 welded to a lower outer periphery of the hub 20.

In order to prevent the reel 2 from turning over during off-periods of operation, a means to press and bias the reel 2 toward the bottom wall of the case is provided in the hub 20. The biasing means includes a compression coil-type spring 23 and a bearing 24 receiving the spring pressure from the spring 23.

Gear teeth 27 vertically engaged with a drive gear 26 of a drive shaft 25 on the tape drive side are formed on the lower face of a bottom wall 20b of the hub 20. The gear teeth 27 face the outside of the case through a drive aperture 29 open in the bottom wall of the lower case 1b.

As shown in FIG. 5, an identification indicator 30 for identifying type information peculiar to the cartridge including tape characteristics and a tape standard of the magnetic tape 3 on a tape drive side is disposed concentrically about a center of the gear teeth 27 in an outer peripheral portion away from the gear teeth 27 on the bottom surface 20b of the hub 20. The identification indicator 30 is in a two-color circular shape having two kinds of colored portions 31, 32 different in light reflectance formed alternately in a circular ring direction. Herein, only the colored portion 31 is colored while the colored portion 32 presents the color of the bottom surface 20b of the hub 20.

The indicator format of the identification indicator 7 defined by combination of these colored portions 31, 32 is set at various formats in conformity with the type information of the magnetic tape cartridge. More particularly, the indicator format of the identification indicator 7 defined by a length size of the colored portion 31 in rotating direction of the hub 20 and a length size of the colored portion 32 formed between adjacent colored portions 31 and 31 in rotating direction is set to be the format in conformity with the type information of the magnetic tape cartridge.

In FIG. 4, there is shown an optical reader 33 for reading the identification indicator 30. The optical reader 33, which is composed of a light emitting device 35 for irradiating detection light toward the identification indicator 30 and a light receiving device 36 for receiving the detection light reflected by the identification indicator 30, is a single scan line-type reader for detecting an indicator format of the identification indicator 30 with a single beam of detection light irradiated from the light emitting device 35. As shown in FIG. 4, the optical reader 33 is secured in the vicinity of the drive shaft 25 on the tape drive side in an upward posture so as to irradiate detection light toward the rotating position of the identification indicator 30.

When the magnetic tape cartridge is loaded onto the tape drive, the tape drive displaces and moves the magnetic tape cartridge to a specified rotational driving position by a loading mechanism. Next, the tape drive pushes the drive shaft 25 up, by which the drive gear 26 engages with the gear teeth 27 on the bottom surface 20b of the hub 20 through the drive aperture 29, and the reel 2 is put in a slightly uplifted rotatable state as shown in FIG. 4. While the tape drive in such a state rotates the drive shaft 25, the optical reader 33 irradiates detection light from the light emitting device 35 to the identification indicator 30. Based on a detection signal sent at this point from the light receiving device 36, an indicator format of the identification indicator 30 defined by combination of a length size of the rotating direction and an arrangement position of the colored portions 31 is detected, and based on the detection result, the type of the magnetic tape cartridge is determined. Then, based on the determination result, processing corresponding to the type of the magnetic tape cartridge is conducted.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A magnetic tape cartridge, comprising:

a reel disposed inside a main case for housing a magnetic tape in a wounded state; and an identification indicator formed on an outer surface of the main case for identifying type information peculiar to the cartridge including tape characteristics and a tape standard of the magnetic tape on a tape drive side, wherein the identification indicator is in a stripe shape having a grain printed portion and a mirror surface portion arranged alternately toward a loading direction of the magnetic cartridge onto the tape drive, and an indicator format defined by combination of the grain printed portion and the mirror surface portion is set in conformity with the type information, and when loading operation of the magnetic tape cartridge onto the tape drive is conducted, the indicator format of the identification indicator on the magnetic tape cartridge, which is displaced and moved in the loading direction inside the tape drive, is read by an optical reader mounted on the tape drive side, so that the type information on the magnetic tape cartridge can be obtained on the tape drive side.

2. A magnetic tape cartridge, comprising:

a reel disposed inside a main case for housing a magnetic tape in a wounded state;

gear teeth formed on a bottom surface of the reel so as to be vertically engaged with a drive gear of a drive shaft on the tape drive side, the bottom surface of the reel facing an outside of the main case through a drive aperture open in a bottom wall of the main case; and an identification indicator disposed concentrically about a center of the gear teeth in an outer peripheral portion away from the gear teeth on the bottom surface of the reel for identifying type information peculiar to the cartridge including tape characteristics and a tape standard of the magnetic tape on the tape drive side, provided on the bottom surface of the reel and facing the outside of the main case through the drive aperture into which the drive gear of the tape drive side is introduced, wherein the identification indicator is in a two-color circular shape having two kinds of colored portion different in light reflectance formed alternately in a circular ring direction, and an indicator format defined by combination of these colored portions is set in conformity with the type information, and while the reel is rotated by the drive shaft, the indicator format of the identification indicator is read by an optical reader mounted on the tape drive side, so that the type information on the magnetic tape cartridge can be obtained on the tape drive side.

* * * * *